United States Patent
Siebeneick

(10) Patent No.: US 7,832,747 B2
(45) Date of Patent: Nov. 16, 2010

(54) CAR BODY FOR A MOTOR VEHICLE

(75) Inventor: Jürgen Siebeneick, Oberwesel (DE)

(73) Assignee: GM Global Technology Operations, Inc., Detroit, MI (US)

( * ) Notice: Subject to any disclaimer, the term of this patent is extended or adjusted under 35 U.S.C. 154(b) by 157 days.

(21) Appl. No.: 11/613,755

(22) Filed: Dec. 20, 2006

(65) Prior Publication Data
US 2007/0102914 A1  May 10, 2007

Related U.S. Application Data

(63) Continuation of application No. PCT/EP2005/006777, filed on Jun. 23, 2005.

(30) Foreign Application Priority Data
Jun. 24, 2004  (DE) ................. 10 2004 030 471

(51) Int. Cl.
*B60G 7/02* (2006.01)

(52) U.S. Cl. .................. 280/124.109; 280/124.128; 280/124.145; 280/124.147

(58) Field of Classification Search .......... 280/124.109, 280/124.128, 124.134, 124.145, 124.147, 280/124.154
See application file for complete search history.

(56) References Cited

U.S. PATENT DOCUMENTS

| 2,901,242 | A |   | 8/1959 | Elliott et al. |
| 3,856,326 | A | * | 12/1974 | Lindbert et al. ............. 280/734 |
| 3,862,669 | A | * | 1/1975 | Lindbert et al. ............. 280/734 |
| 3,922,002 | A | * | 11/1975 | Lindbert et al. ............. 280/734 |
| 4,620,720 | A | * | 11/1986 | Sakata et al. ........... 280/124.145 |
| 4,684,152 | A | * | 8/1987 | Goodbary et al. ........... 280/785 |
| 4,813,704 | A | * | 3/1989 | Smith .................. 280/124.109 |
| 4,997,201 | A | * | 3/1991 | Schaible .............. 280/124.145 |
| 5,470,096 | A | * | 11/1995 | Baxter ................ 280/124.116 |
| 5,560,638 | A | * | 10/1996 | Lee ..................... 280/124.143 |
| 6,203,027 | B1 | * | 3/2001 | Ishikawa et al. ......... 280/6.154 |
| 6,951,343 | B2 | * | 10/2005 | Hildebrand .......... 280/124.175 |

FOREIGN PATENT DOCUMENTS

| DE | 1164251 |     | 2/1964 |
| DE | 4022137 | C1  | 1/1992 |
| DE | 4317479 | A1  | 9/1994 |
| DE | 19722942 | A1 | 12/1998 |
| DE | 29800158 | U1 | 5/1999 |
| DE | 69507073 | T2 | 5/1999 |
| DE | 20013385 | U1 | 11/2000 |
| DE | 10244361 | A1 | 4/2004 |
| DE | 10247492 | A1 | 4/2004 |
| DE | 69909807 | T2 | 4/2004 |
| EP | 0305727 | A2  | 3/1989 |
| EP | 0547346 |     | 6/1993 |
| EP | 1084935 | A2  | 3/2001 |

* cited by examiner

*Primary Examiner*—Toan C To
(74) *Attorney, Agent, or Firm*—Ingrassia Fisher & Lorenz, P.C.

(57) ABSTRACT

A pressure chamber of a gas spring damping unit is arranged within the cross section of a longitudinal beam in a motor vehicle body. For this purpose, a tubular connecting piece that is closed by a cover is welded into the longitudinal beam. A piston of the gas spring damping unit is arranged in longitudinally displaceable manner in the connecting piece. The space occupied by the gas spring damping unit is thereby kept particularly small.

7 Claims, 1 Drawing Sheet

US 7,832,747 B2

CAR BODY FOR A MOTOR VEHICLE

CROSS-REFERENCE TO RELATED APPLICATIONS

This is a continuation of International Application No. PCT/EP2005/006777, filed Jun. 23, 2005, which application claims priority to German Application No. 10 2004 030 471.8, filed Jun. 24, 2004, which are hereby incorporated by reference in their entirety.

TECHNICAL FIELD

The invention relates to a motor vehicle body for a motor vehicle comprising a frame part and a gas spring damping unit and including a pressure chamber of the gas spring damping unit which is delimited by a piston.

BACKGROUND

Gas spring damping units are known in principle, for example, from EP 0 160 277 B 1. An embodiment utilising the so-called two-chamber design is characterised by its greater overall height than that of known pneumatic springs or steel springs, mini block springs for example. In consequence, the gas spring damping unit needs a very large amount of space.

SUMMARY

The invention is based on the problem of designing a motor vehicle body of the kind mentioned hereinabove in such a way that it is of particularly low weight and is of particularly compact construction in the region of the gas spring damping unit.

In accordance with the invention, this problem is solved in that the frame part has a seating for at least a sub portion of the gas spring damping unit.

Due to this design, a sub portion of the gas spring damping unit, the pressure chamber for example, can be integrated in the frame part. In consequence, the gas spring damping unit does not need a complicated form of attachment to the frame part. The motor vehicle body in accordance with the invention can thus be designed to be particularly low, this thereby leading to the motor vehicle having a particularly low loading area. Furthermore, the integration of the sub portion of the gas spring damping unit into the frame part leads to the weight of the motor vehicle body and the gas spring damping unit being particularly low.

The gas spring damping unit could comprise a cartouche incorporating the pressure chamber for example and be inserted and fixed into the seating of the frame part. However, the motor vehicle body in accordance with the invention requires a particularly small number of components if the frame part comprises a tubular connecting piece which is closed at one end for the formation of the pressure chamber and if the piston is guided in longitudinally displaceable manner in the tubular connecting piece.

The motor vehicle body in accordance with the invention is of particularly compact design if at least a sub portion of the pressure chamber is arranged within the cross section of a longitudinal beam of the motor vehicle body. Hereby, the longitudinal beam forms the frame part.

The process of manufacturing the motor vehicle body in accordance with the invention is particularly simple, if the connecting piece is welded to the frame part.

For the purposes of contributing to a further decrease in the weight of the motor vehicle body in accordance with the invention, the connecting piece is an aluminium profile. Preferably, the aluminium profile is manufactured using an extrusion process. A guideway for the piston is preferably improved by an anodic surface treatment.

The connecting piece could comprise a blind hole for the seating of the piston for example. However, in accordance with another advantageous further development of the invention, the gas spring damping unit can be produced in a particularly simple manner if the connecting piece is closed in gas-tight manner by a cover. The gas-tight connection of the cover to the connecting piece is preferably effected in cohesive manner by welding or adhesion.

In accordance with another advantageous further development of the invention, the gas spring damping unit is of particularly simply construction if the end of the connecting piece remote from the cover has a collar for the attachment in gas-tight manner of rubber bellows. In consequence, the motor vehicle body in accordance with the invention needs particularly few components.

For the purposes of contributing to a simplification in the mounting of the gas spring damping unit in the motor vehicle body in accordance with the invention, a piston rod that is connected to the piston has, at the end thereof remote from the piston, a bearing comprising a rubber damper for attachment to an axle of the motor vehicle body.

BRIEF DESCRIPTION OF THE DRAWINGS

The present invention will hereinafter be described in conjunction with the following drawing figures, wherein like numerals denote like elements, and FIG. 1 schematically shows a rear sub portion of a motor vehicle incorporating a motor vehicle body in accordance with the invention.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
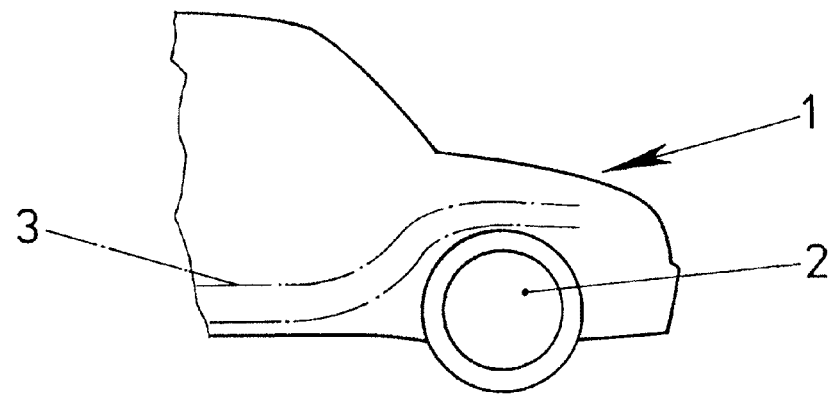

FIG. 1 shows a rear portion of a schematically illustrated motor vehicle body 1 having a left rear wheel 2. A longitudinal beam 3 of the motor vehicle body 1 is represented in the drawing by a dash-dotted line.

Figure 2:
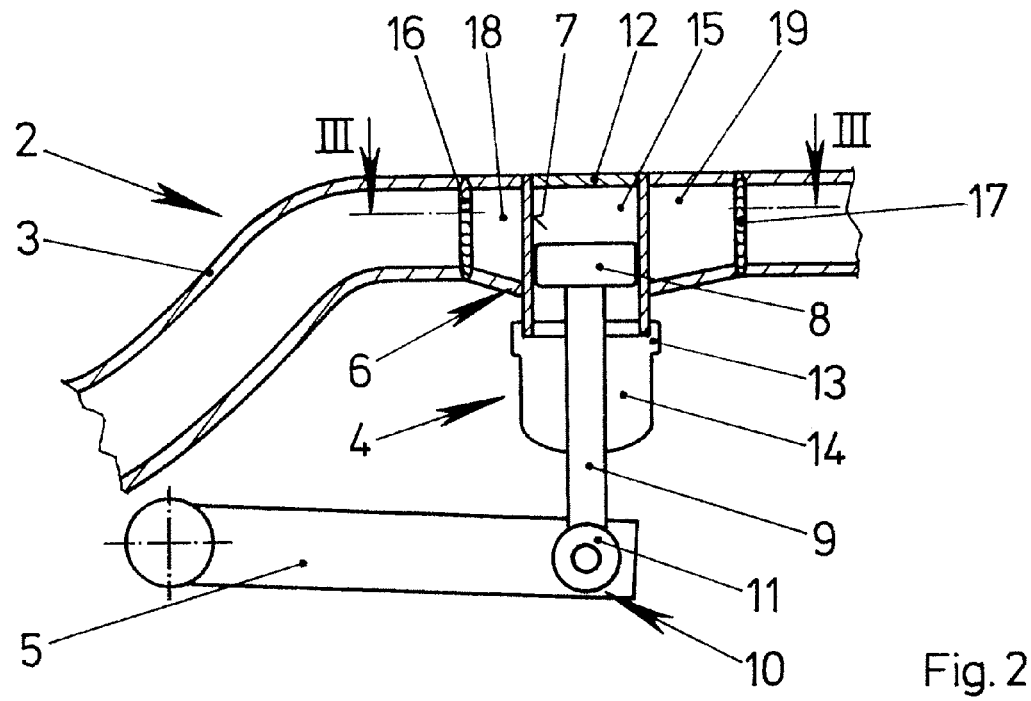
FIG. 2 shows a greatly enlarged illustration of the motor vehicle body in the vicinity of a gas spring damping unit.

FIG. 2 shows a sub portion of the motor vehicle body 1 of FIG. 1 in the vicinity of a gas spring damping unit 4 in the form of a greatly enlarged sectional view. The gas spring damping unit 4 is fixed to the longitudinal beam 3 and is articulated to an axle 5 which is to be connected to the wheel 2 in FIG. 1. The longitudinal beam 3 comprises a tubular connecting piece 6 having a guideway 7 for a piston 8 which is guided in the connecting piece 6 in longitudinally displaceable manner. The piston 8 is fixed on a piston rod 9. A bearing 10 comprising a rubber damper 11 is provided for the attachment of the piston rod 9 to the axle 5. The connecting piece 6 is closed in gas-tight manner at the end thereof remote from the axle 5 by a cover 12. The cover 12 is welded in the connecting piece 6 for example. At the end thereof remote from the axle 5, the connecting piece 6 has a collar 13 for the attachment in gas-tight manner of rubber bellows 14. In addition, the rubber bellows 14 is connected in gas-tight manner to the piston rod 9.

The gas spring damping unit 4 has a pressure chamber 15 between the piston 8 and the cover 12. The cover 12 simultaneously forms a stop for the movement of the piston 8. The pressure chamber 15 is arranged completely within the cross section of the longitudinal beam 3. Furthermore, the connecting piece 6 has flanges 18, 19 that are connected by welding seams 16, 17 to the longitudinal beam 3. The connecting piece 6 can be manufactured as an extruded aluminium profile for example.

Figure 3:
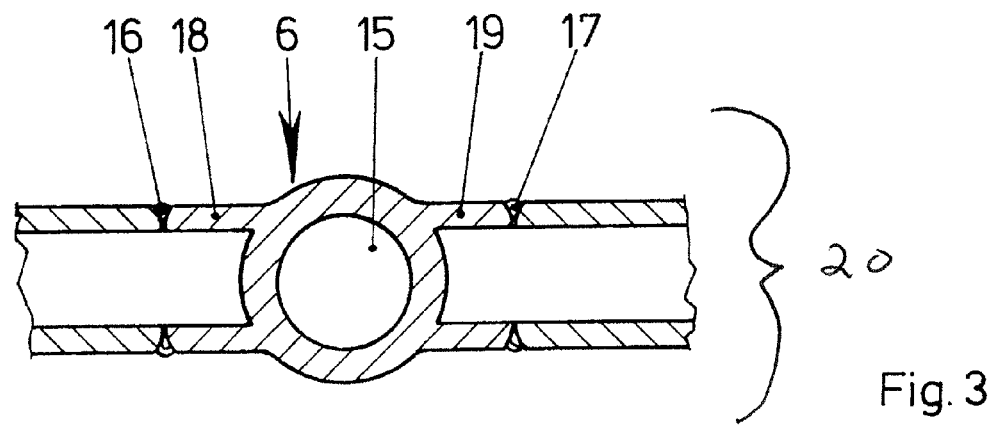
FIG. 3 shows a sectional view through a connecting piece of the motor vehicle body in FIG. 2 along the line III-III.

FIG. 3 shows in a sectional view through the longitudinal beam 3 of FIG. 2 along the line III-III that the flanges 18, 19 of the connecting piece 6 that are welded to the longitudinal beam 3 project in bar-like manner from the connecting piece 6. The flanges 18, 19 are welded to the longitudinal beam 3 at their free ends.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A motor vehicle body for a motor vehicle comprising a frame part and a gas spring damping unit, the gas spring damping unit further comprising a pressure chamber which is delimited by a piston, and the frame part further comprising a seating for a tubular connecting piece which is closed at one end for forming the pressure chamber and in that the piston is guided in the tubular connecting piece in a longitudinally displaceable manner.

2. The motor vehicle body in accordance with claim 1, wherein the seating is arranged within the cross section of a longitudinal beam of the motor vehicle body.

3. The motor vehicle body in accordance with claim 1, wherein the connecting piece is welded to the frame part.

4. The motor vehicle body in accordance with claim 1, wherein the connecting piece is an aluminium profile.

5. The motor vehicle body in accordance with claim 1, wherein the connecting piece is closed in gas-tight manner by a cover.

6. The motor vehicle body in accordance with claim 5, wherein the end of the connecting piece remote from the cover has a collar for the attachment of a rubber bellows in gas-tight manner.

7. The motor vehicle body in accordance claim 5, wherein a piston rod connected to the piston has, at the end thereof remote from the piston, a bearing comprising a rubber damper for attachment to an axle of the motor vehicle body.

* * * * *

UNITED STATES PATENT AND TRADEMARK OFFICE
CERTIFICATE OF CORRECTION

| | | |
|---|---|---|
| PATENT NO. | : 7,832,747 B2 | Page 1 of 1 |
| APPLICATION NO. | : 11/613755 | |
| DATED | : November 16, 2010 | |
| INVENTOR(S) | : Juergen Siebeneick | |

It is certified that error appears in the above-identified patent and that said Letters Patent is hereby corrected as shown below:

Column 4, line 26 "in accordance claim 5" should read --in accordance with claim 5--.

Signed and Sealed this
Tenth Day of May, 2011

David J. Kappos
*Director of the United States Patent and Trademark Office*